United States Patent
Hayashi et al.

(10) Patent No.: US 7,260,992 B2
(45) Date of Patent: Aug. 28, 2007

(54) PRESSURE SENSOR, FLOWMETER ELECTRONIC COMPONENT, AND METHOD FOR MANUFACTURING THE SAME

(75) Inventors: Masahide Hayashi, Mito (JP);
Katsuhiko Kikuchi, Hitachinaka (JP);
Hiromichi Ebine, Ohmiya (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/500,873

(22) PCT Filed: Jan. 17, 2003

(86) PCT No.: PCT/JP03/00351

§ 371 (c)(1),
(2), (4) Date: Jul. 7, 2004

(87) PCT Pub. No.: WO03/062779

PCT Pub. Date: Jul. 31, 2003

(65) Prior Publication Data

US 2005/0115328 A1    Jun. 2, 2005

(30) Foreign Application Priority Data

Jan. 18, 2002    (JP)  .............................. 2002-009388

(51) Int. Cl.
*G01L 7/00*    (2006.01)

(52) U.S. Cl. .......................................... 73/700; 73/754
(58) Field of Classification Search .................. 73/700, 73/754

See application file for complete search history.

(56) References Cited

FOREIGN PATENT DOCUMENTS

| JP | 6-3211 | 1/1994 |
|---|---|---|
| JP | 6-186104 | 7/1994 |
| JP | 7-294351 | 11/1995 |
| JP | 8-94466 | 4/1996 |
| JP | 9-323337 | 12/1997 |
| JP | 11-304619 | 11/1999 |
| JP | 2001116639 A * | 4/2001 |
| JP | 2001-330530 | 11/2001 |

* cited by examiner

*Primary Examiner*—Edward Lefkowitz
*Assistant Examiner*—Andre J. Allen
(74) *Attorney, Agent, or Firm*—Crowell & Moring LLP

(57) ABSTRACT

An outer case connector portion, a gauge housing case, and the like for use with a pressure sensor, for example, are generally made of a thermoplastic or thermosetting resin. However, the resin physically causes curing shrinkage. Especially when a metal is insert molded with a resin, curing shrinkage of the resin generates a gap at the interface between the resin and the metal. By filling an anaerobic, high-permeability adhesive in the gap, hermetic sealing can be ensured and reliability can be enhanced. Inexpensive hermetic sealing and enhanced reliability are realized.

4 Claims, 4 Drawing Sheets

AREA IN ENLARGED SCALE OF PORTION A

PRESSURE SENSOR, FLOWMETER ELECTRONIC COMPONENT, AND METHOD FOR MANUFACTURING THE SAME

TECHNICAL FIELD

The present invention relates to a sensor for detecting a fluid pressure, a flowmeter for detecting a fluid flow rate, an electronic component for use in them, and a method for manufacturing the electronic component.

BACKGROUND ART

In the known structures disclosed in JP,A 6-3211 and JP,A 6-186104, when a metallic lead member is insert molded with, e.g., an organic resin material, a small gap generates at the interface between the resin and the metallic lead member due to resin's physical properties, i.e., the difference in coefficient of linear expansion between the resin and a metal and curing shrinkage of the resin itself occurred when the resin temperature is returned to room temperature after melting. In a pressure sensor, especially, hermetic sealing after insert molding of the pressure sensor is important from the viewpoint of ensuring satisfactory sensor characteristics. None of the above-mentioned publications, however, takes into consideration a hermetic sealing structure for reducing the small gap and providing positive sealing.

Also, JP,A 11-304619 and JP,A 2001-330530 propose the use of a protective material, such as a gel, for ensuring hermetic sealing when a metallic lead member is insert molded with, e.g., an organic resin material.

DISCLOSURE OF THE INVENTION

However, the known art described above has problems that the gel is not hardened in the small gap and sufficient hermetic sealing cannot be ensured.

BEST MODE FOR CARRYING OUT THE INVENTION

The construction of an embodiment of the present invention will be described below with reference to FIGS. 1 to 3.

Figure 1:
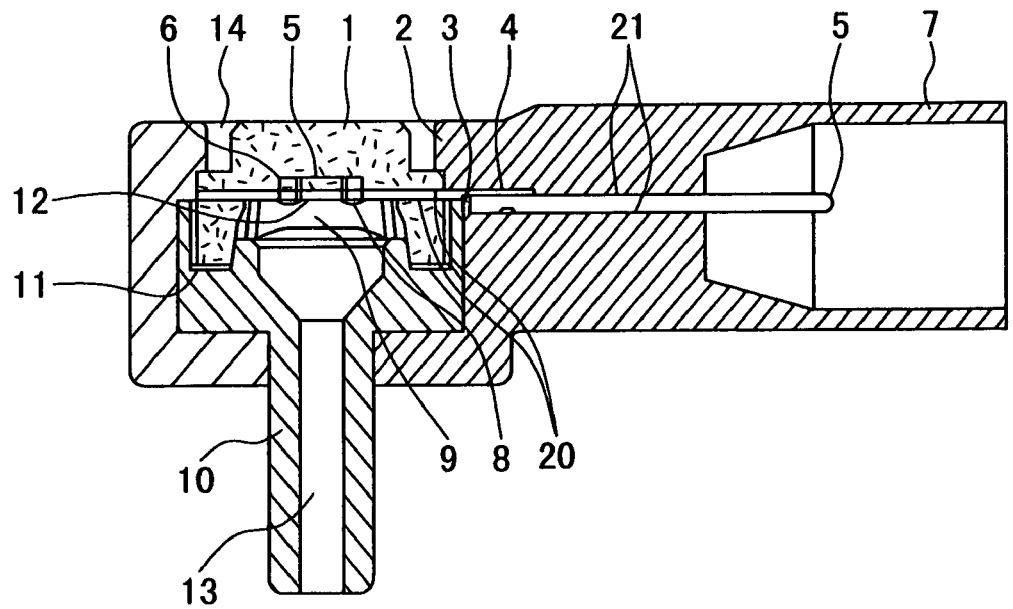
FIG. 1 is a vertical sectional view of a pressure sensor according to an embodiment of the present invention.
Figure 2:
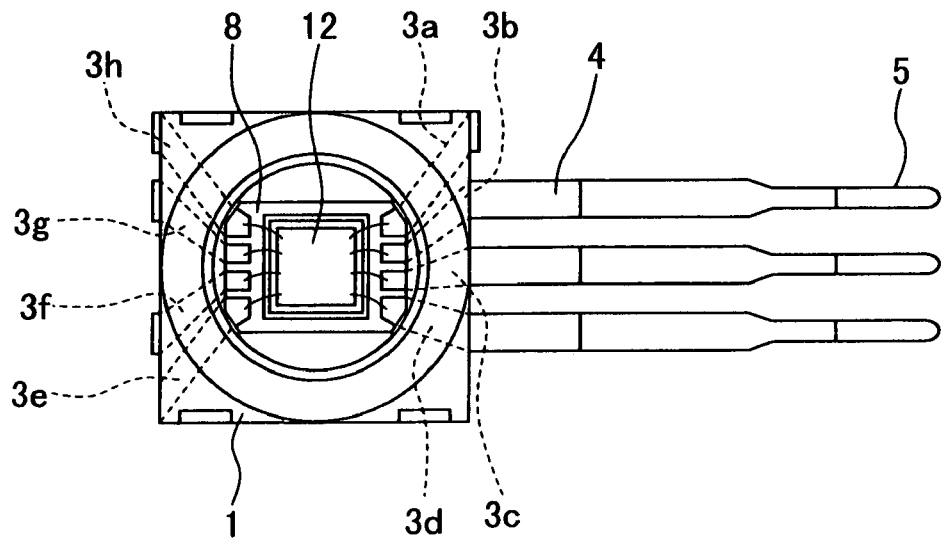
FIG. 2 is a front view of a gauge case according to an embodiment of the present invention.
Figure 3:
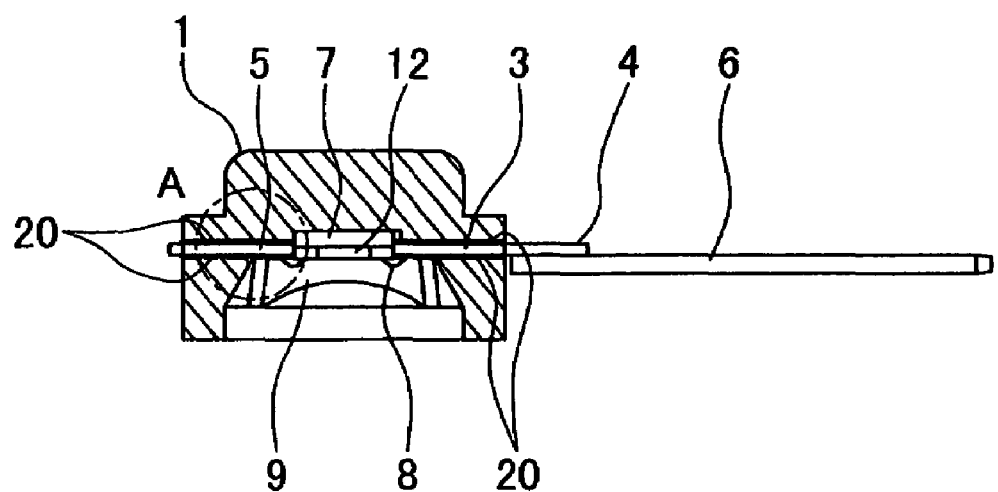
FIG. 3 is a vertical sectional view of the gauge case according to an embodiment of the present invention.
Figure 3:
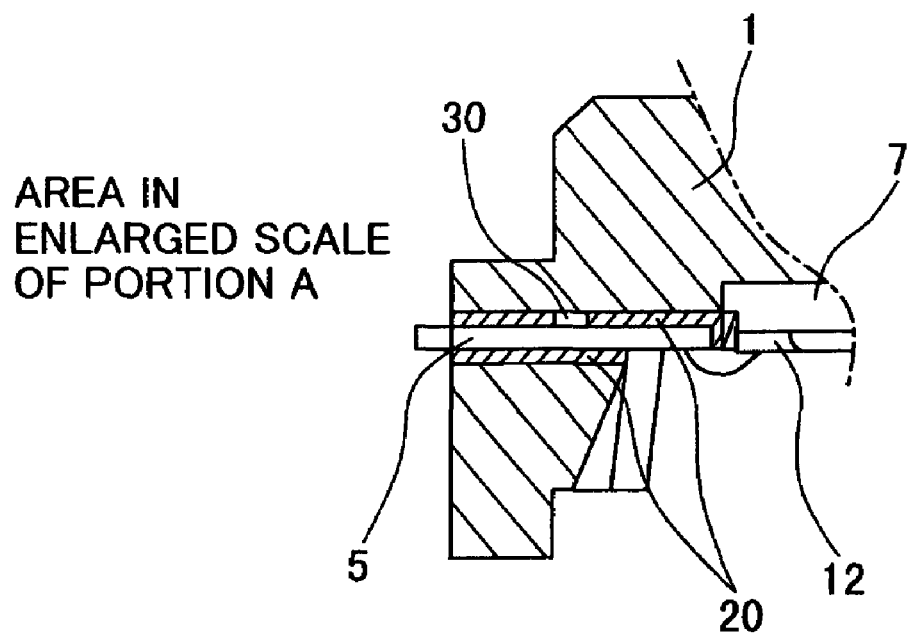
Figure 4:
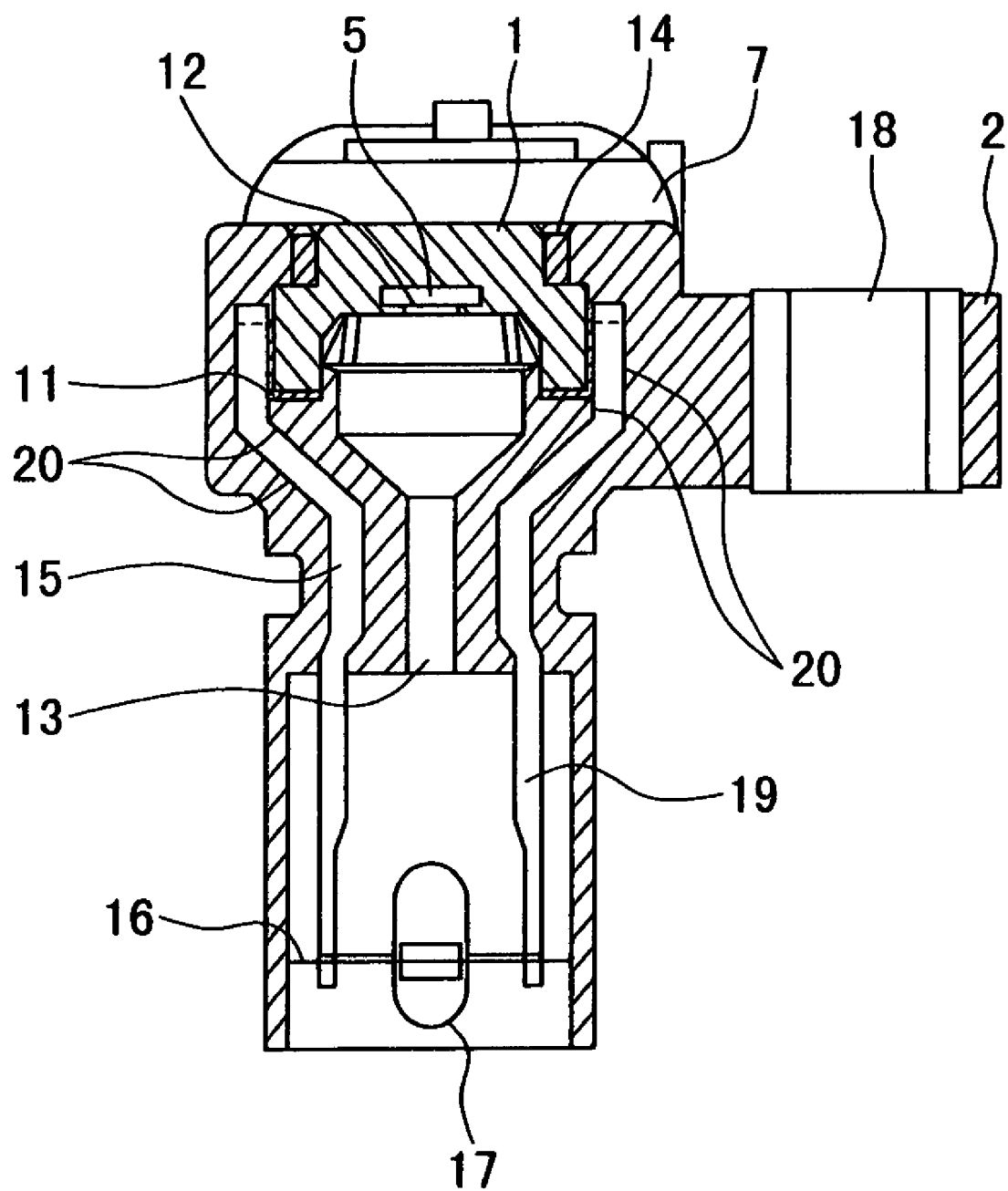
FIG. 4 is a vertical sectional view of a pressure sensor with an intake temperature measuring sensor according to an embodiment of the present invention.

FIG. 1 is a vertical sectional view of a pressure sensor, FIG. 2 is a front view of a gauge case, FIG. 3 is a vertical sectional view of the gauge case, and FIG. 4 is a vertical sectional view of a pressure sensor with an intake temperature measuring sensor.

A semiconductor chip 12 is made of silicone. The semiconductor chip 12 is joined to a glass base 6 by anodic bonding or the like.

A gauge case 1 is made of a thermosetting resin such as an epoxy resin, or a thermoplastic resin such as PPS. Metallic lead members 3 are each made of plated phosphor bronze.

A gauge assembly comprising the semiconductor chip 12 and the glass base 6 joined to each other is fixedly bonded to the gauge case 1 through a metallic terminal 5. Also, total eight metallic lead members 3 are insert molded in the gauge case 1 and have respective inner end surfaces partly exposed. The exposed inner end surfaces are bonded to respective bonding areas of the semiconductor chip 12 by bonding wires 8 for electrical connection therebetween. An area including the semiconductor chip 12 is coated with a protective material 9, such as a fluorosilicone-based or fluorine-based silicone gel, for the purpose of protection against a corrosive gas or liquid, etc. Further, metallic terminals 5 for connection to an external power supply are welded to the gauge case 1, whereby the gauge case 1 is completed.

A pipe 10 provided with a pressure introducing hole 13, shown in FIG. 1, is made of a PBT or PPS resin. The gauge case 1 is fixedly bonded to the pipe 10 in a hermetic manner by using an adhesive 11. The whole of a resulting assembly is integral-molded with, e.g., the PBT or PPS resin while, though not shown, a mount metallic collar is simultaneously insert molded in a mount flange, thereby forming a pressure sensor including a connector portion 7. Subsequently, a silicone adhesive, an epoxy adhesive or the like is poured and then cured in hollows 14, which have been used for retaining the gauge case 1 during the molding step. The pressure sensor is thereby completed.

In the pressure sensor described above, the metallic lead members 3 and the metallic terminals 5 are insert molded with, e.g., the PBT or PPS resin. In this insert molding step, small gaps 20 generate between the metallic lead members 3 and the gauge case 1, and small gaps 21 generate between the metallic terminals 5 and the connector portion 7.

The feature of the present invention will be described below with reference to FIGS. 1, 2, 3 and 4.

In the gauge case 1 shown in FIG. 2, portions of individual metallic lead members 3a to 3h, indicated by dotted lines, are buried in the epoxy or PPS resin. Also, as shown in FIG. 1, when the connector portion 7 is molded with the PBT or PPS resin 2, the metallic terminals 5 are buried in the PBT or PPS resin together with the gauge case 1 shown in FIG. 3. Thus, the pressure sensor has a structure that the metallic lead members 3a to 3h and the metallic terminals 5 are each buried in the resin. In this state, due to physical properties, the resin 2 has the coefficient of linear expansion different from those of the metallic lead members 3a to 3h and the metallic terminals 5, and the resin 2 itself causes shrinkage of about 1% when returned to room temperature after being molten in the molding step. Hence, the small gaps 20, 21 necessarily generate between the metal and the resin. The generation of those gaps raises the following problems. For example, if open air is repeatedly sucked and discharged through the gaps in response to fluctuations of engine pressure, the protective material 9 is moved over relatively large strokes, causing the bonding wires 8 to move correspondingly and undergo fatigue breakage, which leads to a failure. Even in the case not causing the fatigue breakage, characteristics of the pressure sensor become unstable. In the present invention, a polymethacrylic or other anaerobic adhesive or an acrylic or other high-permeability adhesive is filled in the gaps between the resin 2 and the metallic lead members 3a to 3h and the metallic terminals 5 by a spontaneous or vacuum permeation method. As a result, complete hermatic sealing can be ensured.

FIG. 3 shows a vertical section of the gauge case 1 and an area including the metallic lead member in an enlarged scale.

When the anaerobic or high-permeability adhesive is filled in the gaps so as to ensure hermetic sealing, an air bubble 30 remains sometimes because of insufficient degassing. In the case of filling the anaerobic adhesive according to the present invention, however, even if the air bubble 30 remains, the anaerobic adhesive serves to block movements of the air bubble and retain it at one location in a stable state. Therefore, the wires 8 electrically connecting the semiconductor chip 12 and the metallic lead members 3 are prevented from disconnecting due to the movements of the air bubble 30, and a pressure transformer with high reliability can be obtained. Further, by filling the anaerobic adhesive in the small gaps 21, shown in FIG. 1, between the metallic terminals 5 and the connector portion 7 in a similar way, hermetic sealing of the small gaps 21 can be ensured and a pressure transformer capable of ensuring the hermetic sealing with higher reliability can be obtained. Such use of the anaerobic or high-permeability adhesive is also applicable to, besides the pressure transformer, other electronic components in which metallic terminals are insert molded and small gaps are generated between the metallic terminals and a connector portion. With that application, a protective material (such as a gel or an adhesive) for protecting a physical variable measuring device can be prevented from entering the small gaps and from seeping into the connector portion. As a result, the yield is increased and an electronic component with high reliability can be obtained.

FIG. 4 is a vertical sectional view of a pressure transformer with an intake temperature measuring sensor. Small gaps 20 generate between a resin and a metallic lead (1) 15 and a metallic lead (2) 19, both the metallic leads supporting an intake temperature sensor 16. As in the present invention described above, therefore, by filling, e.g., the anaerobic adhesive in the small gaps for hermetic sealing, a leakage of intake air can be prevented, whereby a pressure transformer and an intake temperature sensor with high reliability and high accuracy can be obtained.

Figure 5:
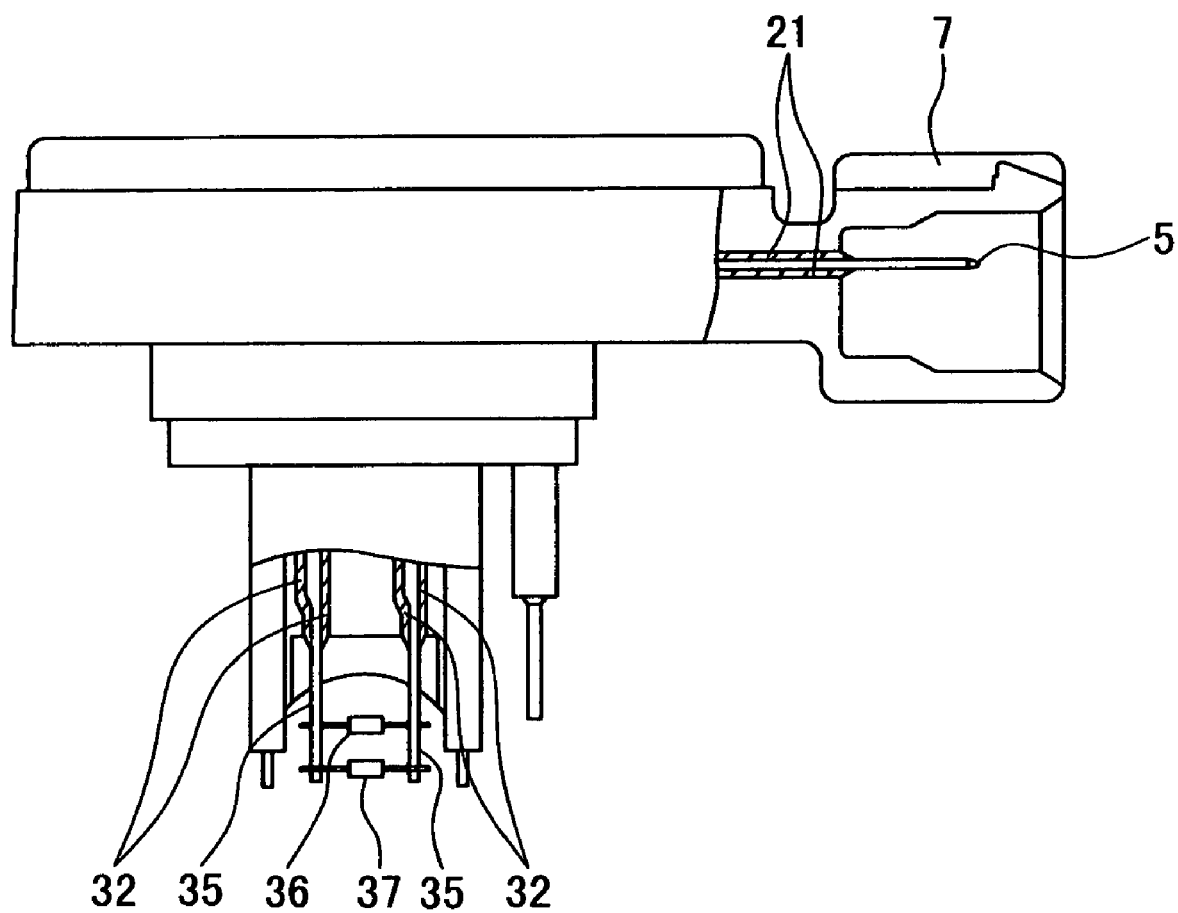
FIG. 5 is a vertical sectional view of components of an air flow sensor according to an embodiment of the present invention.

FIG. 5 is a vertical sectional view of a flowmeter. Small gaps 21 generate between metallic terminals 5 and the connector portion 7, and small gaps 32 generate between a resin and metallic leads 35 which support respectively resistance element 36 and 37. As in the present invention described above, therefore, by filling, e.g., the anaerobic adhesive in all or a part of the small gaps for hermetic sealing, a leakage of intake air can be prevented, whereby a flowmeter with high reliability and high accuracy can be obtained.

A manufacturing method to realize the hermetic sealing structure according to the present invention is as follows.

After molding the gauge case 1, shown in FIG. 3, with the metallic lead members 3 inserted therein, the molded gauge case 1 is immersed in a high-permeability adhesive, such as an anaerobic adhesive. After the immersion, the gauge case 1 is placed in a vacuum state to purge out air bubbles 30 remaining in the small gaps 20 between the gauge case 1 and the metallic lead members 3. After being placed in the vacuum state, the gauge case 1 is taken out from the anaerobic adhesive and is left to stand in the atmosphere. At this time, a plurality of guage cases are left to stand in the atmosphere in a such state that they are not in close contact with each other. If the guage cases are left to stand in close contact with each other. If the guage cases are left to stand in clise contact with each other, there may occur a problem that terminals of the adjacent guage cases are bonded to each other. For that raeason, the guage cases must be avoided from being left to stand in the atmosphere in the closely contact state. After being left to stand in the atmosphere, the adhesive is removed by using an organic solvent for cleaning of the guage case in the state where the small gaps are completely heretically sealed (i.e., in the state where the adhesive has been hardened).

Through the steps described above, it is possible to hermetically seal the small gaps generated when molding the gauge case 1 with the metallic lead members 3 inserted therein.

According to this embodiment, by filling the anaerobic, high-permeability resin in gaps between a resin and the metallic lead members and the metallic terminal members which are insert molded in the resin, hermetic sealing is ensured in a small-sized pressure sensor in which the hermetic sealing is especially important, and hence the performance of the pressure sensor can be improved.

The invention claimed is:

1. A pressure sensor comprising metallic terminals, a resin material molded integrally with said metallic terminals, and a semiconductor sensor and therefor a signal processing circuit placed in said resin material, wherein an anaerobic adhesive is filled in gaps between said metallic terminals and said resin material after integrally molding said resin material with said metallic terminals, and wherein said semiconductor sensor and therefor said signal processing circuit are placed in an outer resin case, said outer resin case being molded integrally with metallic lead members for outputting a processed signal of said signal processing circuit, and the anaerobic adhesive is filled in gaps between said metallic lead members and said resin material after integrally molding said outer resin case with said metallic lead members.

2. A pressure sensor according to claim 1, wherein said anaerobic adhesive is a polymethacrylic adhesive.

3. A pressure sensor comprising metallic terminals, a resin material molded integrally with said metallic terminals, and a semiconductor sensor and therefor a signal processing circuit placed in said resin material, wherein a high-permeability adhesive is filled in gaps between said metallic terminals and said resin material after integrally molding said resin material with said metallic terminals, and wherein said semiconductor sensor and therefor said signal processing circuit are placed in an outer resin case, said outer resin case being molded integrally with metallic lead members for outputting a processed signal of said signal processing circuit, and the high-permeability adhesive is filled in gaps between said metallic lead members and said resin material after integrally molding said outer resin case with said metallic end members.

4. A pressure sensor according to claim 3, wherein said high-permeability adhesive is an acrylic adhesive.

* * * * *